United States Patent
Kikugawa

(10) Patent No.: US 8,045,431 B2
(45) Date of Patent: Oct. 25, 2011

(54) SIGNAL CONVERSION MODULE AND OPTICAL DISC APPARATUS USING THE SAME

(75) Inventor: Atsushi Kikugawa, Tokyo (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 184 days.

(21) Appl. No.: 12/509,614

(22) Filed: Jul. 27, 2009

(65) Prior Publication Data

US 2010/0027390 A1   Feb. 4, 2010

(30) Foreign Application Priority Data

Jul. 30, 2008   (JP) ................... 2008-196177

(51) Int. Cl.
*G11B 7/00* (2006.01)
(52) U.S. Cl. .............. 369/47.28; 369/47.17; 369/124.12
(58) Field of Classification Search ................ 369/47.28
See application file for complete search history.

(56) References Cited

U.S. PATENT DOCUMENTS

| | | | |
|---|---|---|---|
| 2007/0053262 A1 | 3/2007 | Kikugawa et al. | |
| 2007/0121450 A1* | 5/2007 | Shoji et al. ................ | 369/47.53 |
| 2008/0219132 A1 | 9/2008 | Kikugawa | |
| 2009/0103418 A1 | 4/2009 | Kikugawa | |

FOREIGN PATENT DOCUMENTS

| | | | |
|---|---|---|---|
| JP | 06004810 A | * | 1/1994 |
| JP | 2007-73147 A | | 3/2007 |

OTHER PUBLICATIONS

A. Arimoto et al., Noise Reduction of Diode Laser Video Disc Players with High Frequency Current Superposition, Optics, vol. 14, No. 5, Apr. 24, 1985, pp. 377-384.
F. Op'T Eynde et al., Analog Interfaces for Digital Signal Processing Systems, Kluwer Academic Publishers, 1993, pp. 91-92.
A. Kikukawa et al., Novel HF-pulse read signal converter for increasing read signal SNR, Digest of International Symposium on Optical Memory 2007, pp. 302-303.

* cited by examiner

*Primary Examiner* — Jorge Ortiz Criado
(74) *Attorney, Agent, or Firm* — Mattingly & Malur, PC

(57) ABSTRACT

In the multi-tone demodulation (MTD) technique, even if an input bandwidth is widened to obtain a larger SNR gain, an increase in the signal to noise ration (SNR) gain cannot always be obtained due to clock jitter that increases clock noise. Also, noise is sometimes superimposed on the clock supplied to an analog to digital converter circuit (ADS) and the noise lowers the performance. Accordingly, the optical disc apparatus loosely regulates the bandwidth of a pulsed read signal; boosts the high-frequency components of a waveform of a driving signal of a laser diode; and synchronizes autonomously a driving clock of the ADC and a digital to analog converter circuit (DAC) with a clock of the pulsed read signal.

7 Claims, 13 Drawing Sheets

PRIOR ART

PRIOR ART

SIGNAL CONVERSION MODULE AND OPTICAL DISC APPARATUS USING THE SAME

CLAIM OF PRIORITY

The present application claims priority from Japanese patent application JP 2008-196177 filed on Jul. 30, 2008, the content of which is hereby incorporated by reference into this application.

CROSS REFERENCE TO RELATED APPLICATION

U.S. patent application Ser. No. 12/362,378 is a co-pending application of this application, the content of which is incorporated herein by cross-reference.

BACKGROUND OF THE INVENTION

1. Field of the Invention

The invention relates to a reproduction technique of an optical disc drive.

2. Description of Related Art

The invention is applicable not only to Blu-ray Disc (BD) drives but also to other types of optical disc apparatuses. Nevertheless, the descriptions that follow are based on the BD drives and the terms that are used in the following descriptions are basically the same as those in the field of the BD drives.

Many of the existing optical disc apparatuses, such as BD drives adopt the high-frequency superimposing method to reduce noise that is produced by the laser diode used as its light source. This technique is disclosed in Non-Patent Document 1 and has been known to those skilled in the art. So, the descriptions of the technique are limited to only a part thereof that necessary for the descriptions that follow. No further details will be described.

In the optical system of an optical disc drive, if a part of the laser beams that are reflected by the surface of the disc enters the oscillating laser diode, such entry destabilizes the oscillation of the laser diode, and thus produces a significant amount of laser noise. The high-frequency superimposing method is used to avoid the production of such laser noise. The name "high-frequency superimposing" method comes from the fact that the laser diode emits pulsed laser light by superimposing a high-frequency signal over the driving signal of the laser diode. FIG. 2 illustrates the waveform of the emitted light. Light emission and light extinction are repetitively alternated. Note that the ratio (duty) of each light-emitting period to each interval between two adjacent laser pulses (modulation frequency) is a parameter that is to be adjusted so as to minimize the laser noise. Specifically, the frequency and the duty are selected so that the laser pulse that is reflected by the surface of the disc cannot enter the oscillating laser diode.

If the pulsed laser beam is focused on the recording film of the optical disc, the intensity of the reflected laser beam varies depending upon whether the position irradiated with the laser beam is a mark or a space. Accordingly, the amplitudes of the laser pulses are modulated. If there is no bandwidth limitation imposed by the photodiode for reproduction or by the current to voltage amplifier, the read signal waveform will look like as shown in FIG. 3. Hereafter, the signal made of such a read pulse string will be referred to as the pulsed read signal. The dashed line in FIG. 3 represents the read signal waveform obtained when the laser is made to oscillate continuously with an output level that is the same as the level of the peak of the laser pulse at the time of high-frequency superimposition. To put it differently, the upper-side envelope of the pulsed read signal has a shape of the read waveform caused by the continuous light. Thus, a desired read waveform can be obtained by an envelope detection, that is, by passing the pulsed read signal through a low-pass filter having a cut-off frequency sufficiently lower than the frequency of the high-frequency current that is superimposed on the pulsed read signal. The existing optical disc apparatuses achieve the desired read waveform by means of a bandwidth limitation that is imposed by a system including a photodetector and a current to voltage amplifier as well as by an analog equalizer.

Pulsing read signal is a sort of amplitude modulation. Thus, not only the line-like spectrum of the superimposed high-frequency signal, but also the components of the modulated read signal are observed near the line-like spectrum. For this reason, in the following descriptions of this disclosure, the superimposed high-frequency signal will be referred simply to as the "carrier."

A possible, standard frequency for carrier is, for example, 400 MHz in the case of BD drives. The frequency depends solely on the optical path length of the read optical system, so that there seem to be no big differences among different apparatuses.

FIG. 4 illustrates an exemplar spectrum of a pulsed read signal. The dashed line in FIG. 4 represents, schematically, how the bandwidth limitation is imposed by the system including the photodetector and the current to voltage amplifier as well as by the analog equalizer. As shown in FIG. 4, the conversion of a pulsed read signal to a continuous signal according to the conventional method can be accomplished by totally attenuating the harmonic components. Accordingly, the amplitude of the obtained read signal becomes smaller. The ratio of the amplitude thus obtained to the amplitude of the pulsed read signal is approximately equal to the pulse duty.

A technique known as the multi-tone demodulation (MTD) is a technique to prevent such decline of the SNR. Detailed descriptions of this technique are disclosed in Patent Document 1, and Non-Patent document 2 also describes the technique.

[Patent Document 1] Japanese Patent Application Publication No. 2007-73147

[Non-Patent Document 1] Akira Arimoto et al., "Kosyuha-denryu cyojyohou ni yoru handotai-reza tosai video-disuku-pureiya no reza-noizu teigen-ka (Reduction in Laser Noise of Video Disc Player Equipped with Semiconductor Laser by High-Frequency Current Superimposing Method)", Kogaku (Optics), vol. 14, no. 5, pp. 377-383.

[Non-Patent Document 2] Frank Op't Eynde and Willy Sansen, Analog Interfaces for Digital Signal Processing Systems, Kluwer Academic Publishers, 1993, Boston/Dordrecht/London, pp. 91-92.

[Non-Patent Document 3] Atsushi Kikukawa and Hiroyuki Minemura, "Novel HF-pulse read signal converter for increasing read signal SNR", Digest of International Symposium on Optical Memory 2007, pp. 302-303.

SUMMARY OF THE INVENTION

FIG. 5 illustrates an exemplar configuration of an apparatus to execute the MTD. Note that those portions that are not necessary for the following descriptions are not illustrated in FIG. 5. The portion that is mainly illustrated in FIG. 5 is a pickup portion. In addition, as a means for converting the pulsed read signal to a continuous waveform, a peak-hold circuit 18 is used in this example.

The carrier is generated by an oscillator 15, and then inputted into a laser driver 14. The laser driver 14 generates a laser-driving current such that a desired average laser power, a desired peak power, and a desired duty can be obtained. The laser-driving current thus generated is inputted into a laser diode 6. In addition, the laser driver 14 regulates the laser-driving current so that the average output of the laser can be constant. FIG. 2 illustrates the temporal changing of the intensity of the light outputted from the laser diode 6.

A collimator lens 5 converts the outputted laser beam to a parallel beam. The parallel beam passes through a polarizing beam splitter 4 and a quarter wave length plate 3, and then is focused on a surface of a recording film of a disc 1 by means of an objective lens 2. The laser beam is reflected by the surface of the recording film, thus will become a reflected pulsed laser train with the superimposition of the intensity changes in accordance with the recording marks and the spaces. The temporal changing of the intensity of the laser light is similar to the pulsed read signal illustrated in FIG. 3. The reflected pulsed laser train returns back to the polarizing beam splitter 4 via the same path, and then is reflected by the polarizing beam splitter 4. The reflected pulsed laser string is then condensed, by a focusing lens 7 on a photodiode 8 and thus is turned into an electrical current. The current thus generated is converted into a voltage signal by a current amplifier 10, and then is inputted into the peak-hold circuit 18. The peak-hold circuit 18 receives the output of an HF oscillator as the control signal. There is a phase difference between the HF signal and the pulsed read signal, and the difference is caused by a delay that occurs in the processes up to the photodiode and up to the laser light emission. A variable delay line 16 adjusts the phase difference. Note that, as described in "Description of Related Art," FIG. 3 illustrates a case where there is no bandwidth limitation imposed by the photodiode for reproduction or by the current to voltage amplifier. Existence of such bandwidth limitations imposed by these members widens individual pulses and lowers the peak values. The degree of the widening and of the lowering depends on the degree of the bandwidth limitations. Nevertheless, if there is a band frequency that is as wide as a certain band frequency, a signal that is approximately equal to the signal shown in FIG. 3 can be obtained.

Next, descriptions will be given as to some of the effects of the peak-hold circuit 18 and the continuous signal obtained as a result of providing the peak-hold circuit 18. For the sake of simplicity, the descriptions are based on an assumption of an ideal operation of the peak-hold circuit 18. FIG. 6 illustrates the relationship between the pulsed read signal and the output of the peak-hold circuit 18. In FIG. 6, the dashed line represents the pulsed read signal; the dashed-dotted line represents the read signal; and the solid line represents the output of the peak-hold circuit 18. Once the peak-hold circuit 18 identifies a peak of the pulsed read signal, the peak-hold circuit 18 keeps the value of the identified peak until the next pulse peak can be identified. Accordingly, the output of the peak-hold circuit has a step-like shape as shown in FIG. 6.

The following descriptions are based, for the sake of simplicity, on the assumption that the read signal is a sinusoidal wave with a frequency of f. FIG. 7 schematically illustrates the spectrum obtained when the sinusoidal wave is subjected to a pulse modulation with a frequency of $f_{HF}$. Since it is assumed that the read signal is a sinusoidal wave, the spectrum of the read signal and its harmonic spectrum are line-like spectra.

Note that, in the descriptions of this disclosure, the order of the signal harmonics is the same as that of the modulation frequency. Specifically, the modulation frequency itself is of first order. Direct current is formally referred as zero order. In addition, the harmonics on the negative frequency side will be referred to as those with negative signs. Accordingly, the negative modulation frequency itself is of negative first order. The amplitudes of the signal harmonics located at the higher-side and the lower-side side bands of each modulation frequency are respectively referred to as a(i, +) and a(i, −) with the corresponding signs added thereto respectively. In addition, the band with a width of $f_{HF}$ and with the harmonic of the modulating frequency being the center thereof is referred to as a harmonic band.

Suppose a case where the sinusoidal wave that has been subjected to the pulse modulation is subjected to a sampling process with the modulating frequency as in the case of FIG. 6. In this case, the harmonic components except for the baseband components have frequencies of $f_{HF}/2$ or higher and thus are under-sampled. As publicly-known, if the signal that is under-sampled, the resultant sampled signal is the subjected to frequency conversion by an amount that is equal to the difference in frequency between the two. Specifically, those signals located in the band of a width of $f_{HF}$ with each of the frequencies of $\pm f_{HF}$ being at the center in FIG. 7 are subjected to the frequency conversion to the basebands. In addition, the frequencies of the signals located in higher harmonic bands are also converted to the basebands, respectively. These are easily understood by those skilled in the art. Specifically, by means of the MTD, all the harmonic signal components within an input band are converted to values within the baseband. Those skilled in the art may easily understand that the signals thus converted have not only similar frequencies, but also similar phases to one another. Accordingly, as a consequence of MTD, each signal harmonic is synchronously added to the read signal component (zero-order signal harmonic) within the baseband. Therefore, the amplitude of the signal component A of the output of the MTD can be expressed with the following equation (1):

$$A = \left| \sum_{i=0}^{M} a(i, +) \right| + \left| \sum_{i=0}^{M} a(i, -) \right| \quad (1)$$

In the meanwhile, each noise component in the harmonic bands is also frequency converted to the baseband by the MTD, and forms a part of the noise of the MTD output. The noise components in the harmonic bands are not correlated with one another, so that the noise components that have been frequency converted from the harmonic band to a baseband are subjected to un-synchronized addition. Accordingly, the amplitude thereof is equal to the square-root of the squared sum of the components. Here if it is assumed that the noise spectrum is flat within the input band, and that the average amplitude is denoted by n, the noise outputted by the MTD can be expressed as follows:

$$N = \sqrt{2M} n \quad (2)$$

If the increase ratio of the signal amplitude caused by the MTD is larger than the increase ratio of the noise amplitude, the SNR is improved. Note that it is not generally possible to conclude that the equations (1) and (2) guarantee an improvement in the SNR. FIG. 8 is an exemplar calculation result the signal and the noise amplitude dependency relative to the input bandwidth. The calculation is based on an assumption that the pulse of the laser is a rectangular wave and that the duty of the laser pulse is ⅛. The input signal bandwidth is limited by using a 12th order Butterworth low-pass filter. The horizontal axis of FIG. 8 represents the input bandwidth $B_w$ normalized by the modulating frequency $f_{HF}$ whereas the vertical axis represents the amplitude of the signal, the amplitude of noise, and the SNR, all of which are expressed by their respective relative values to their corresponding ones obtained by the conventional read method.

As FIG. 8 shows, when the input bandwidth is in a range lower than $4(B_w/f_{HF})$, the amplitude of the signal increases rapidly. Accordingly, in this input bandwidth range, the SNR is improved along with the expansion of the bandwidth. Once the input bandwidth exceeds $4(B_w/f_{HF})$, the increase in the amplitude slows down and almost reaches saturation. This is because the energy of the pulsed read signal is concentrated on the harmonics of relatively low orders. The noise, on the other hand, increases monotonically in accordance with the equation (2). Accordingly, the SNR gain, that is, the improvement of the SNR accomplished by the MTD will saturate.

The foregoing descriptions are based on an assumption that there is no influence of clock jitter at the time of analog to digital conversion. In practice, the clock that drives the analog to digital converter has jitter, and the influence of the jitter inevitably appears. The existence of clock jitter makes the analog to digital converter sample the signal at a wrong time, that is, at a sampling time that is not originally intended. Thus, the acquired sample value differs from the one that would be acquired without the clock jitter. The difference between the value that is actually acquired and the value that would be acquired without jitter is noise. In the following descriptions, the noise of this kind is referred to as the "clock noise." The clock noise is described, for example, in Non-Patent Document 2, and is publicly known. According to Non-Patent Document 2, the amplitude of the clock noise is proportional to the frequency and the amplitude of the signal being sampled. Assuming that the read signal has a sufficiently low frequency, the frequencies of the signal harmonics can be considered to be the same as those of the modulation signals. Accordingly, the clock noise $\delta v_i$ produced by sampling the $i^{th}$-order signal harmonic can be expressed by the following equation (3).

$$\delta_{v_i} = 2\pi\{|a(i,+)|+|a(i,-)|\} i f_{HF} \cos(2\pi i f_{HF} t) \delta t \quad (3)$$

In the equation (3), t represents the time and δt represents the instantaneous jitter.

The dependence of the SNR on the clock jitter is calculated by taking the foregoing into consideration, and the results are shown in FIG. 9. The calculation is performed in three cases with different input bandwidths—specifically, 1.28, 2.56, and 3.52, respectively (the numbers in legend of FIG. 9 represent the input bandwidth normalized by modulating frequency, i.e., $B_w/f_{HF}$). As FIG. 9 clearly shows, when the clock jitter is 0%, the smaller the pulse duty is, the larger the SNR gain becomes. This is a fact also described in Non-Patent Document 3. The SNR gain, however, decreases as the clock jitter increases. This is a logical result deducible from equation (3). In addition, a wider input bandwidth results in a more rapid decrease in the SNR gain relative to the increase in the clock jitter for the following reason. As described above, the amplitude of the clock noise is proportional to the frequency and the amplitude of the signal being sampled. If the input bandwidth is widened, higher-order signal harmonics that produce larger clock noise are additionally inputted or the clock noise as a whole increases as the signal amplitude increases.

Since the clock jitter always has a finite value, the widening of the input bandwidth to obtain a larger SNR gain in the MTD is accompanied by the increase in the clock noise. This poses a problem, which is: the widening of the input bandwidth does not necessarily result in an increase in the SNR gain.

To solve the problem, an aspect of the invention provides an optical disc apparatus including: a means for gradually limiting the bandwidth of a pulsed read signal; a means for boosting high-frequency components of a waveform of a driving signal of a laser diode; these means being achieved using by an equalizer. The optical disc apparatus also includes a means for synchronizing autonomously a driving clock of an ADC and a DAC with a clock of the pulsed read signal.

The aspect of the invention makes it possible to provide an MTD module and an optical disc drive equipped with such module those has a high SNR gain and a wider margin against the clock jitter of the ADC. In addition, by boosting the amplitude of higher-order harmonics of the waveform of the light emitted by the laser, an MTD module with a high SNR gain and an optical disc drive equipped with this MTD module can be provided.

DESCRIPTION OF THE PREFERRED
EMBODIMENTS

Figure 1:
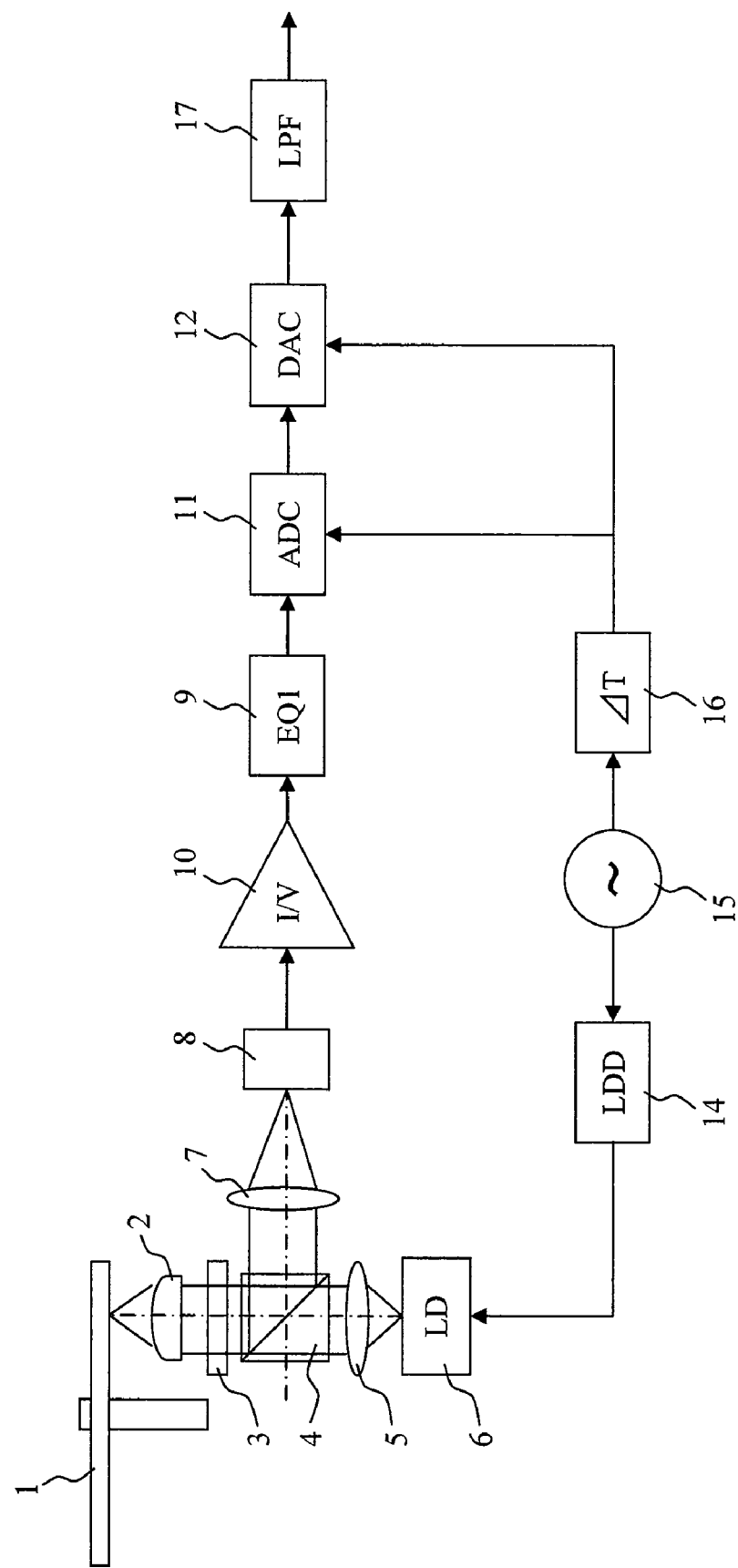
FIG. 1 is a diagram describing an embodiment of the invention.
Figure 2:
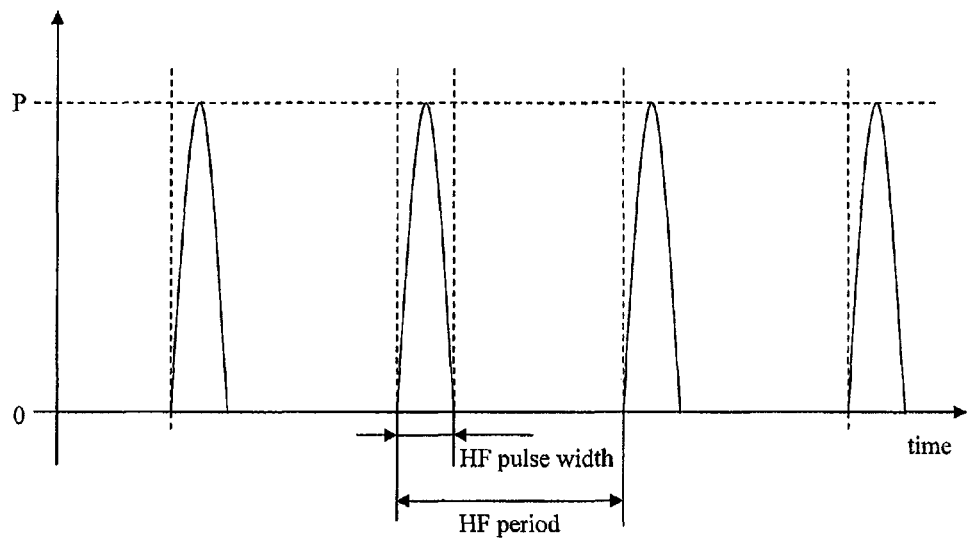
FIG. 2 is a chart describing the waveform of pulsed light emitted from a laser diode in accordance with the high-frequency superimposing method.
Figure 3:
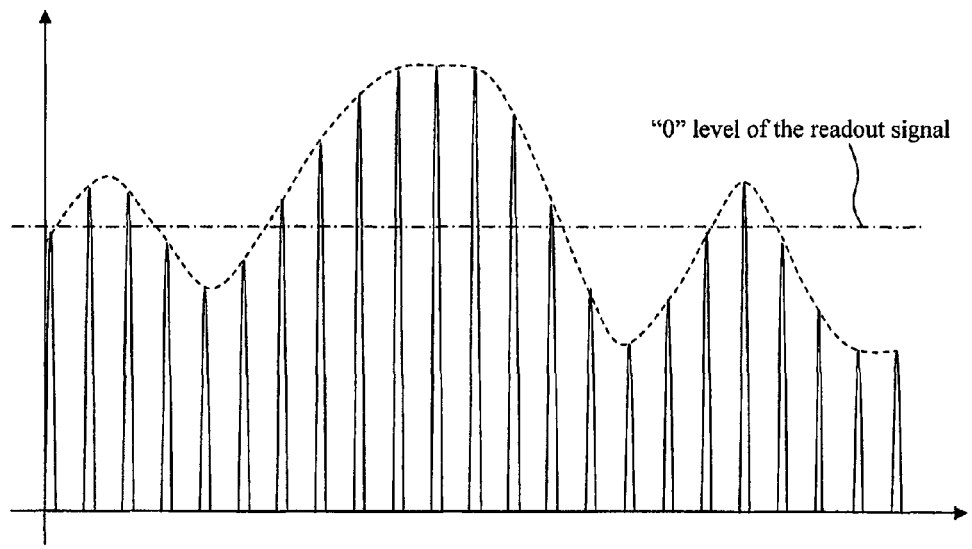
FIG. 3 is a chart describing the waveform of a pulsed read signal.
Figure 4:
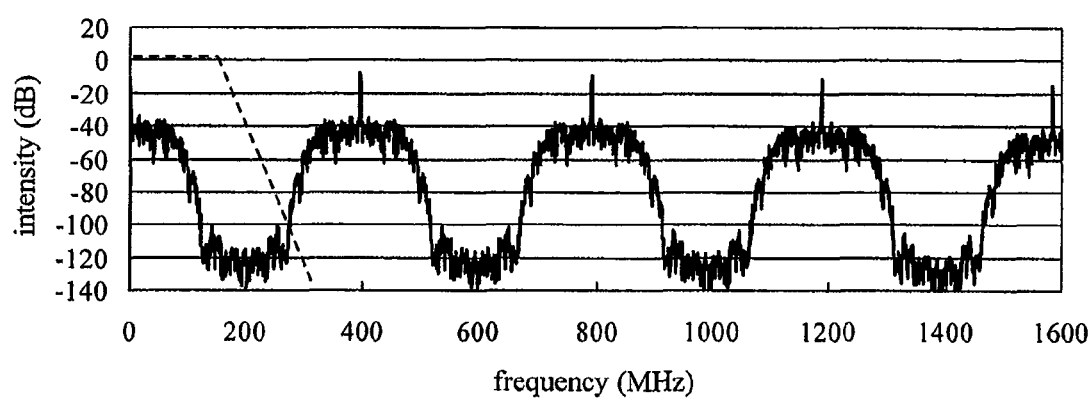
FIG. 4 is a chart illustrating an exemplar spectrum of the pulsed read signal.
Figure 5:
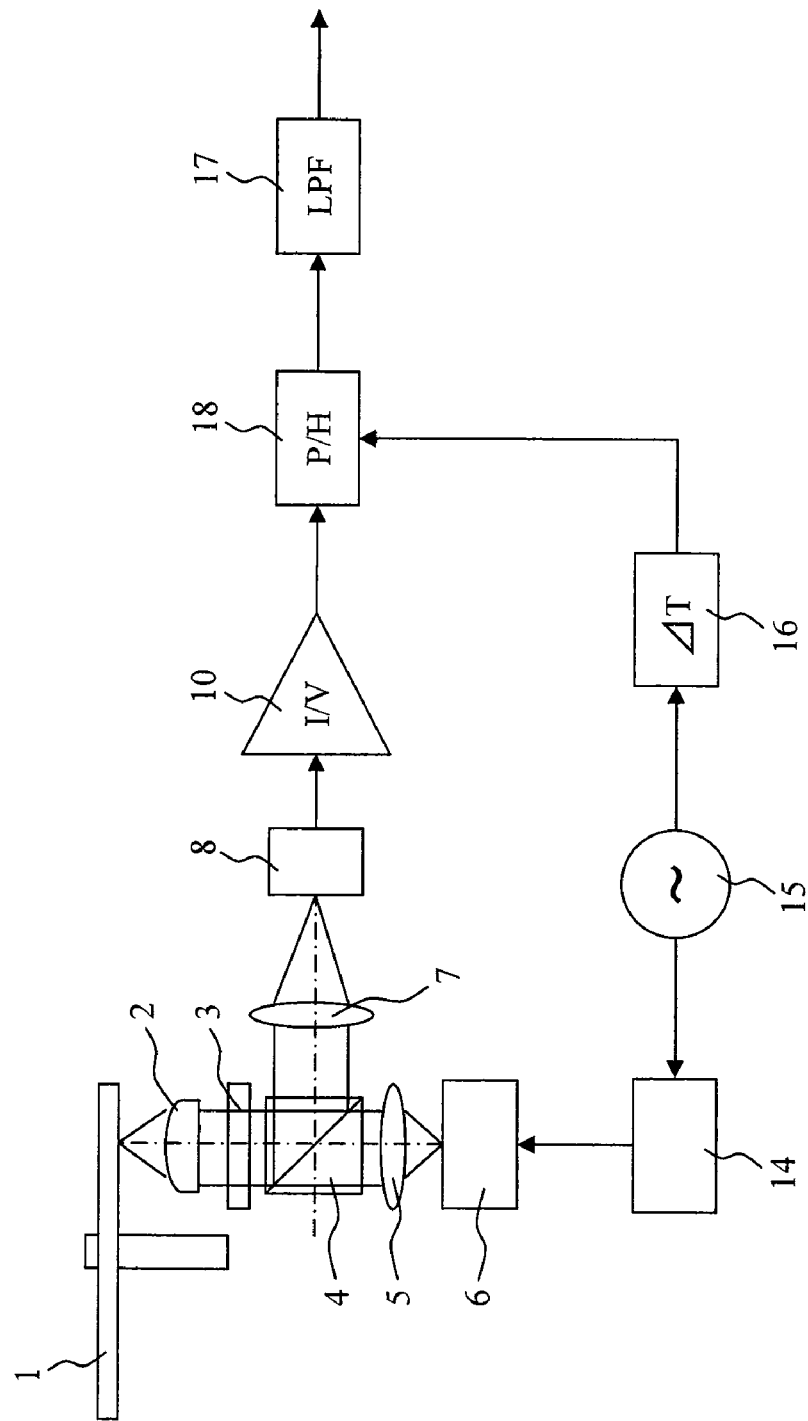
FIG. 5 is a diagram illustrating an exemplar configuration of an apparatus that executes the MTD.
Figure 6:
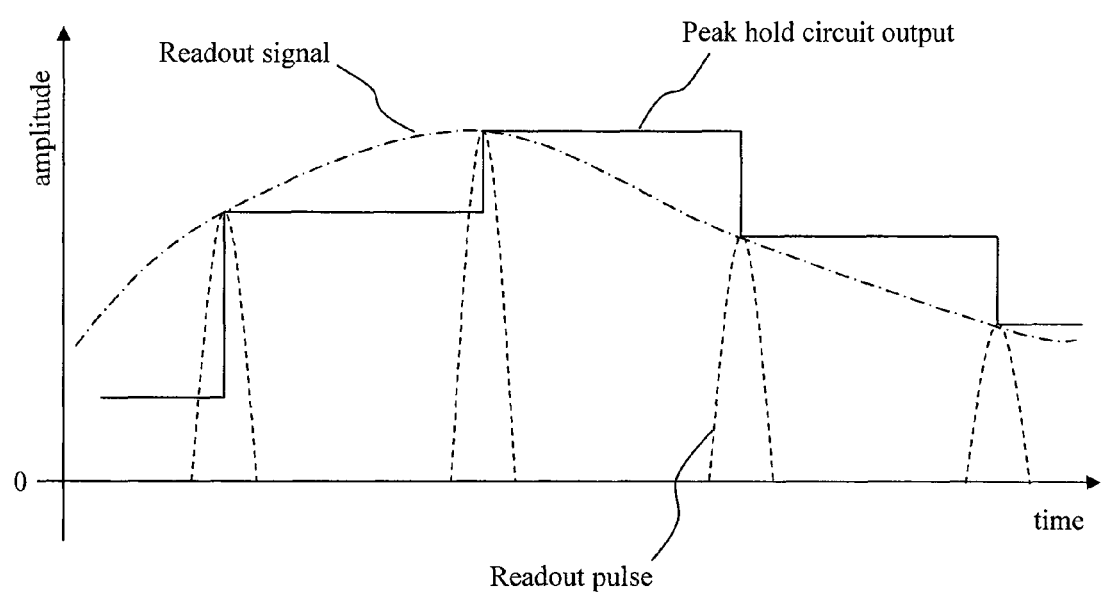
FIG. 6 is a chart describing the operation of the MTD.
Figure 7:
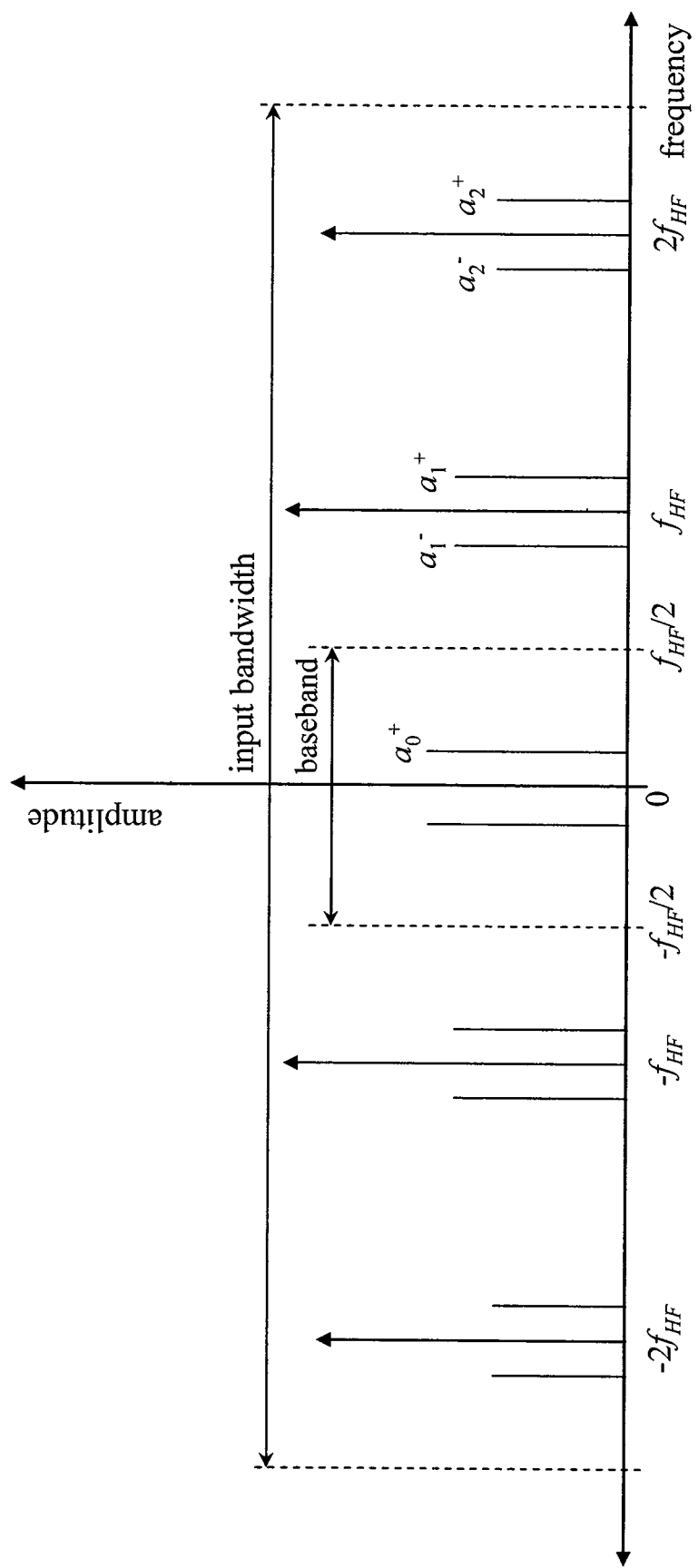
FIG. 7 is a chart describing the spectrum of a pulse modulated sinusoidal signal.
Figure 8:
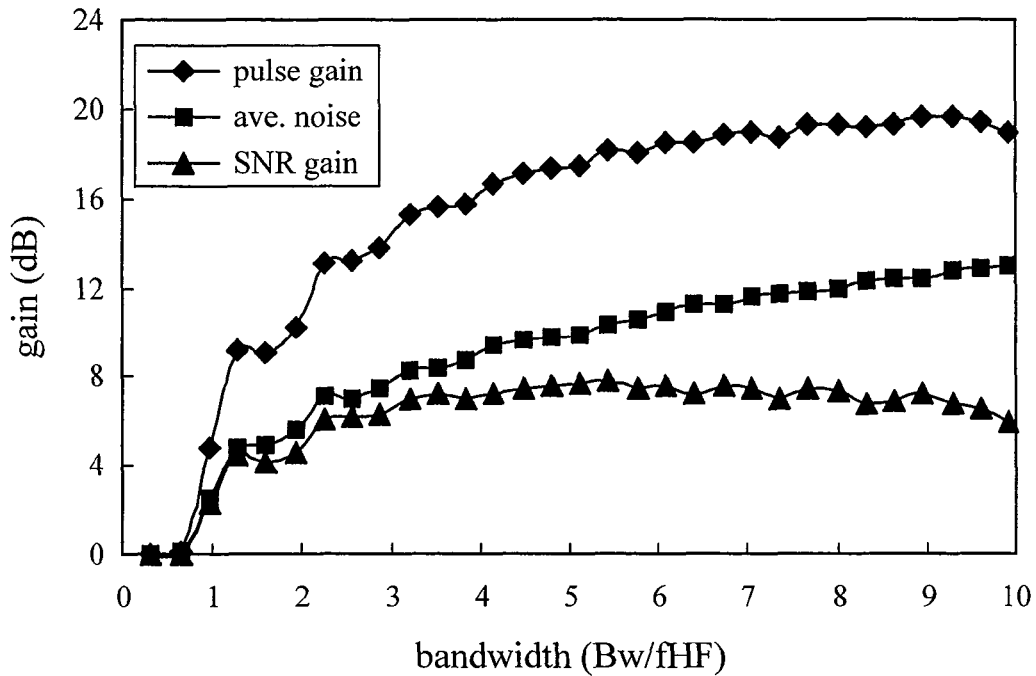
FIG. 8 is a chart illustrating calculation results of the dependence of the SNR gain relative to the input bandwidth.
Figure 9:
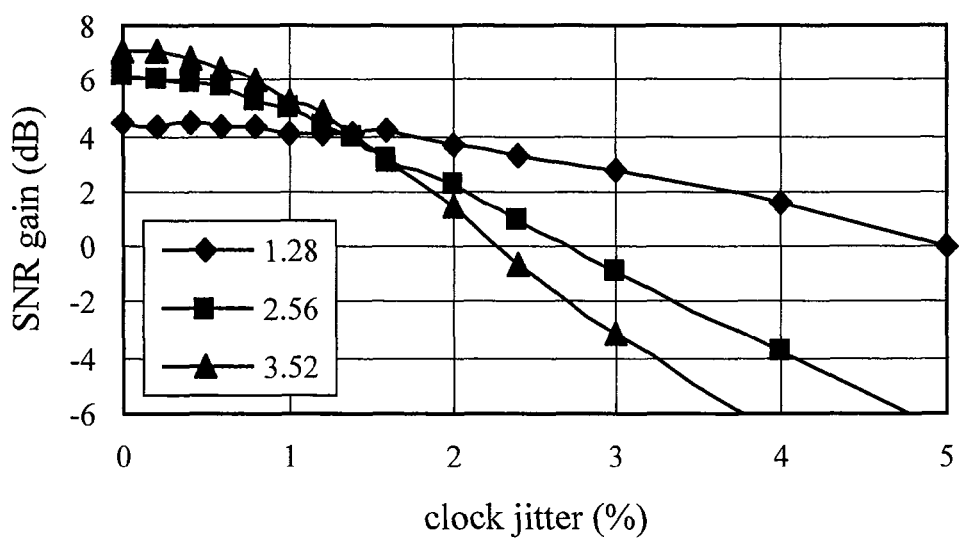
FIG. 9 is a chart illustrating calculation results of the dependence of the SNR gain relative to the clock jitter.

FIG. 1 illustrates an exemplar optical disc apparatus to which the invention is applied. An oscillator 15 generates an original signal which modulates a laser, and it is input to a laser driver 14. The laser driver 14 generates a laser driving signal by, for example, applying an appropriate bias voltage to the output of the oscillator 15. The driving signal is used to drive a laser diode 6. Laser beams are emitted from the laser diode 6. The emitted laser beam is converted to parallel light beam by a collimator 5, which is then made to pass through a polarizing beam splitter 4 and a quarter wave length plate 3. The resultant light beam is focused, by an objective lens 2, on a surface of a recording film of an optical disc 1. The laser beam is reflected by the surface of the recording film, while the intensity of the laser beam is modulated in accordance with whether there is a recording mark or a space at the point actually irradiated by the laser beam. Note that the laser beam is pulse modulated, so that the reflected laser beam actually take a form of reflected laser pulse train. The reflected laser pulse train returns, along the same path but in the opposite direction, back to the polarizing beam splitter 4, and is reflected by the polarizing beam splitter 4. The resultant reflected laser pulse train is focused on a photodiode 8 by a focusing lens 7, and the photodiode 8 converts the pulsed laser string to a current.

A current amplifier 10 converts this current signal to a voltage signal, which is then inputted into a first equalizer 9. The photodiode 8 and the current amplifier 10 used here have bandwidths that are wider than the modulating frequency of the laser. Accordingly, the voltage signal received by the first equalizer 9 is also a pulse signal train, that is, a pulsed read signal. The first equalizer 9 gradually limits the bandwidth of the pulsed read signal. Detailed descriptions of the first equalizer 9 will be given later. The output of the first equalizer 9 is inputted into an ADC (analog to digital converter) 11. The output of the oscillator 15 is inputted to the ADC 11 as the driving clock of the ADC 11. The ADC 11 samples the peaks of the pulses of the pulsed read signal. Phase differences exist between the driving clock of the ADC 11 and the pulses of the pulsed read signal because of the delay that occurs in the photodiode 8 or in the process till the emission of the laser light. A variable delay line 16 is used for adjusting these phase differences. The digital output of the ADC 11 is inputted directly into a DAC (digital to analog converter) 12. The DAC 12 uses the same driving clock that the ADC 11 uses as its own driving clock. The output of the DAC 12 is a step-like signal. The step-like distortion components are removed by a low-pass filter 17 that has an appropriate cut-off frequency. Thus, a read signal is acquired.

As described in the Summary of the Invention, the driving-clock jitter of the ADC 11 is always finite, which imposes a limitation on the performance of the MTD. A higher-order signal harmonic produces clock noise of larger amplitude. That is, the clock noise is proportional to the frequency and the amplitude of the signal harmonic. Meanwhile, it is necessary to use higher-order harmonics to obtain larger amplitude gain.

In the present invention, the first equalizer 9 is used to fulfill the above conflicting requirements. Specifically, in a case where the clock noise caused by the higher-order signal harmonics imposes a predominant limitation on the system performance, the first equalizer 9 slightly reduces the amplitudes of the higher-order signal harmonics, and thus a reduction in the amplitude of the clock noise can be accomplished. Consequently, the amplitude of the total noise can be reduced. To be more specific, the first equalizer 9 reduces the amplitude of the highest-order of the signal harmonics with significant amplitudes within the input bandwidth.

Figure 10:
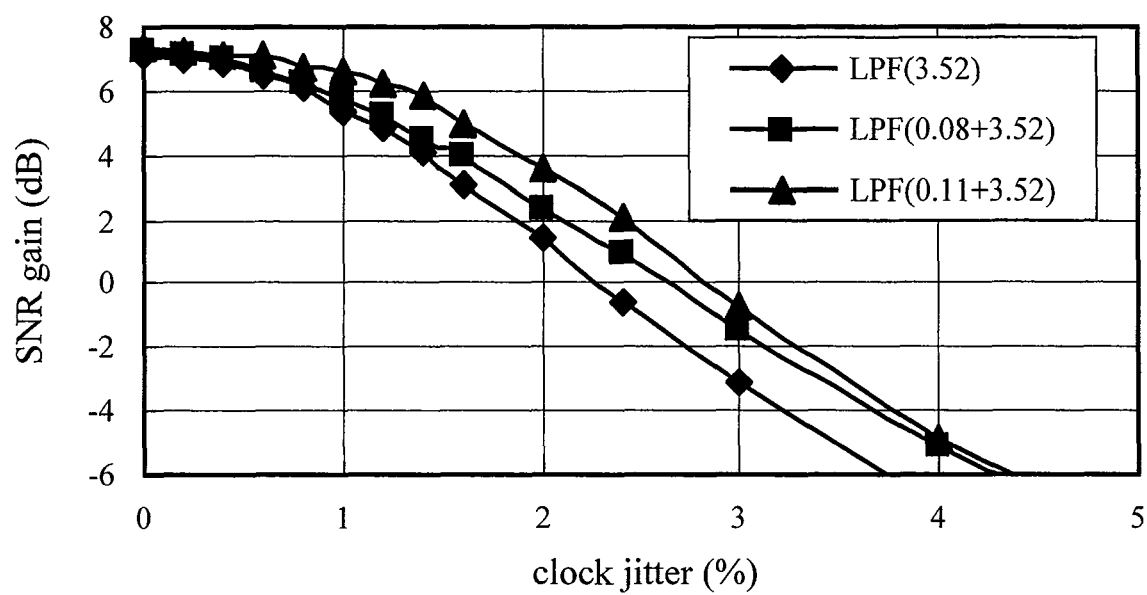
FIG. 10 is a chart illustrating calculation results for the effects of a first equalizer.

FIG. 10 illustrates exemplar calculation results of the SNR gain relative to the clock jitter when a second-order Bessel low-pass filter is used as the first equalizer 9. For comparative purposes, results without the first equalizer 9 is also shown. Specifically, the case with single numerical value stated in the legends of FIG. 10 is the case where equalizer 9 is not used. For the other two cases, the first numerical value given in its legend represents the cut-off frequency of the first equalizer 9. The maximum SNR gains expected are approximately the same for all of the three cases. However, the decrease in the SNR gain relative to the increase in the clock jitter is clearly more moderate in the cases of using the first equalizer 9 than in the case without the first equalizer 9. That is, the case when the first equalizer 9 is used shows higher resistance against the negative influence on the performance by the clock jitter without sacrificing the effect of improving the SNR. Obviously, the position where the first equalizer 9 is to be placed may be between the current amplifier 10 and the ADC 11 as in the case of FIG. 1 or at between the photodiode 8 and the current amplifier 10.

Basically, as also described in Non-Patent Document 3, if the average laser power for read is constant, a smaller pulse duty can make the maximum SNR gain larger in the MTD. Those skilled in the art, however, easily understand that it is not technically easy to generate a laser driving signal with a high frequency and a small pulse duty and then to transmit the driving signal from a laser driver to a laser diode. One of the reasons for the above-mentioned difficulty is that high-frequency components of the pulse signal are easy to be attenuated at the transmission line connecting the laser driver and the laser diode.

Figure 11:
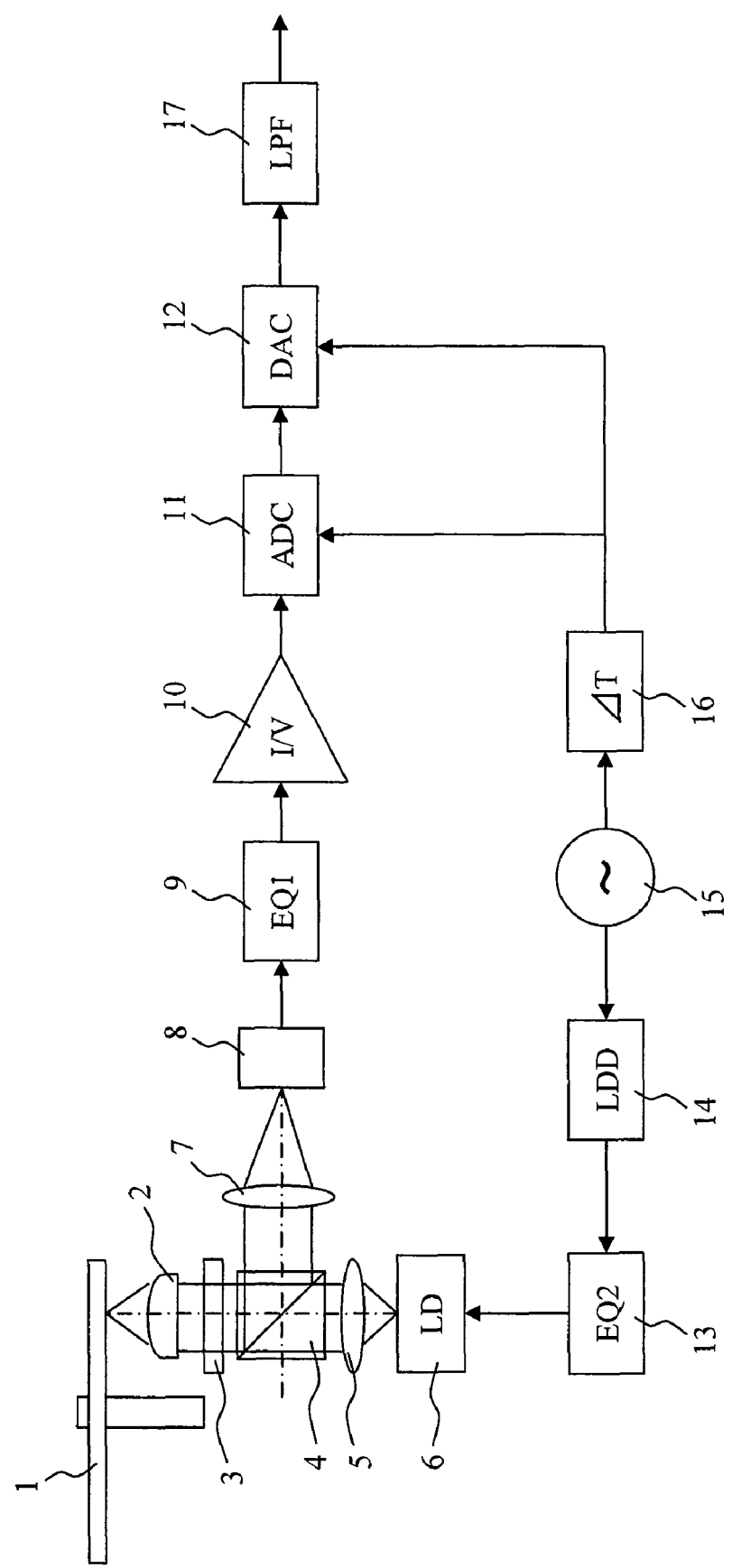
FIG. 11 is a diagram illustrating another embodiment of the invention.

FIG. 11 illustrates another exemplar configuration which differs from the one illustrated in FIG. 1 by inserting the second equalizer 13 between the output of the laser driver 14 and the laser diode 6. The second equalizer 13 has a function to boost high-frequency components of the laser driving signal. The boosted components compensate the loss of high-frequency components in laser driving pulse which is caused at the transmission line connecting the laser driver 14 and the laser diode 6. In addition, by increasing the degree of boosting the high-frequency components, the resulting signal can even have more acute-form pulses than those that the laser driver 14 can generate. This effect is similar to that obtainable when the pulse duty is effectively made smaller.

As described in Patent Document 1 and in as well as FIGS. 1 and 11, the clock signal from the oscillator, which is the signal source for modulating the laser, is appropriately delayed by using a variable delay line 16 for synchronizing the ADC timing. This method has no serious problem if the oscillator 15 and the ADC 11 can be placed close to each other. In practice, however, the oscillator 15 is placed at a position close to the light source of the pickup whereas the ADC 11 is placed at a position close to the photodetector of the pickup. Accordingly, it is sometimes difficult to place the two close to each other. In addition, in some cases noise is superimposed on the clock signal supplied to the ADC 11 depending on distance of the transmission line between them or on the form of mounting. Superimposition of noise on the clock signal is equivalent to increase in the clock jitter, and may thus result in lowering the performance of the entire system.

Figure 12:
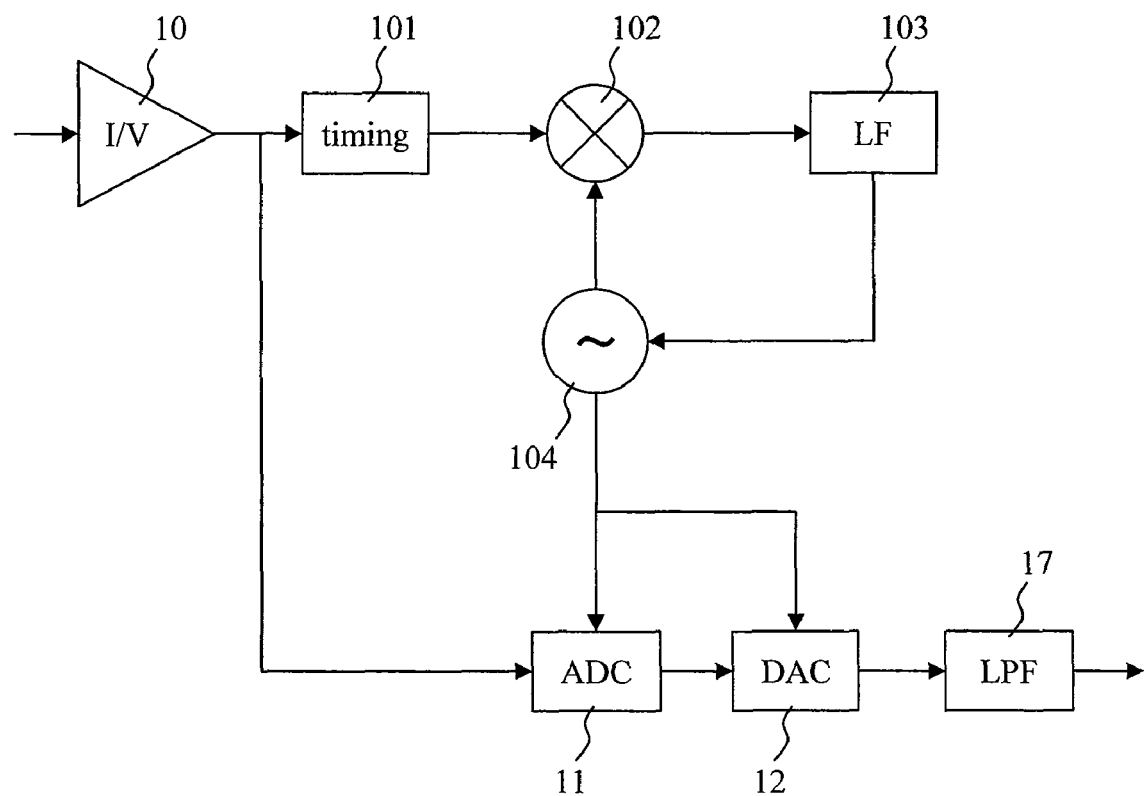
FIG. 12 is a diagram describing a method of autonomously synchronizing the driving clock of an ADC and a DAC to the pulsed read signal clock.

Another exemplar configuration shown in FIG. 12 uses a phase locked loop (PLL) to autonomously synchronize the driving clock of the ADC 11 to the clock of the pulsed read signal. With the use of the PLL, the connection between the oscillator 15 and the ADC 11 is no longer necessary. Note that FIG. 12 illustrates only the portion corresponding to a part of FIG. 1. Specifically, the portion illustrated in FIG. 12 includes the current amplifier 10 and the portions involved in the processes following the current amplifier 10. Only an outline of PLL operation will be described here since it is a well-known technique. As described above, the spectrum of the pulsed read signal includes a line-like spectrum of the carrier with a significant intensity. Accordingly, in the method employed in the configuration of FIG. 12, the carrier is extracted and then the phase of the driving clock of the ADC 11 is synchronized with this extracted carrier. Specifically, the carrier is extracted by making the output of the current amplifier 10—i.e., the pulsed read signal—pass through a timing detection filter 101. The timing detection filter 101, which is a narrow band-pass filter with the center frequency of the passband being the frequency of the carrier, removes the baseband read signal that has a harmful influence in the phase comparison at the subsequent stage as well as the higher-order harmonics of the carrier and of the read signal. The output of the timing detection filter 101 is inputted into a phase comparator 102. Further, the output of a voltage controlled oscillator 104 is inputted into the other input of the phase comparator 102. The phase comparator 102 compares the phase differences of the two input signals, and outputs a phase-error signal. A loop filter 103 smoothes the output of the phase comparator 102, and the resultant smoothed output signal is used as the control signal for the voltage controlled oscillator 104. The voltage controlled oscillator 104 oscillates at a frequency instructed by the control signal. This loop forms the PLL. While the loop is locked, the phase of the output signal of the voltage controlled oscillator 104 is synchronized with the phase of the carrier. Accordingly, with the use of the output of the voltage controlled oscillator 104 as the driving clock of the ADC 11 and of the DAC 12, the operation of the ADC 11 and of that of the DAC 12 can be synchronized with the pulsed read signal.

In the example illustrated in FIG. 12, the center frequency of the passband of the timing detection filter 101 has to match with the carrier frequency. The carrier frequency usable in this example is fixed to a particular frequency, since it is not generally easy to alter the passband frequency of a narrow band-pass filter like the timing detection filter 101. The proper carrier frequency varies depending upon factors such as the optical path length of the pickup. Accordingly, a problem of cost may arise since multiple kinds of timing extracting filters 101 are needed to fit the pickups, or the drives, of different designs, for example.

Figure 13:
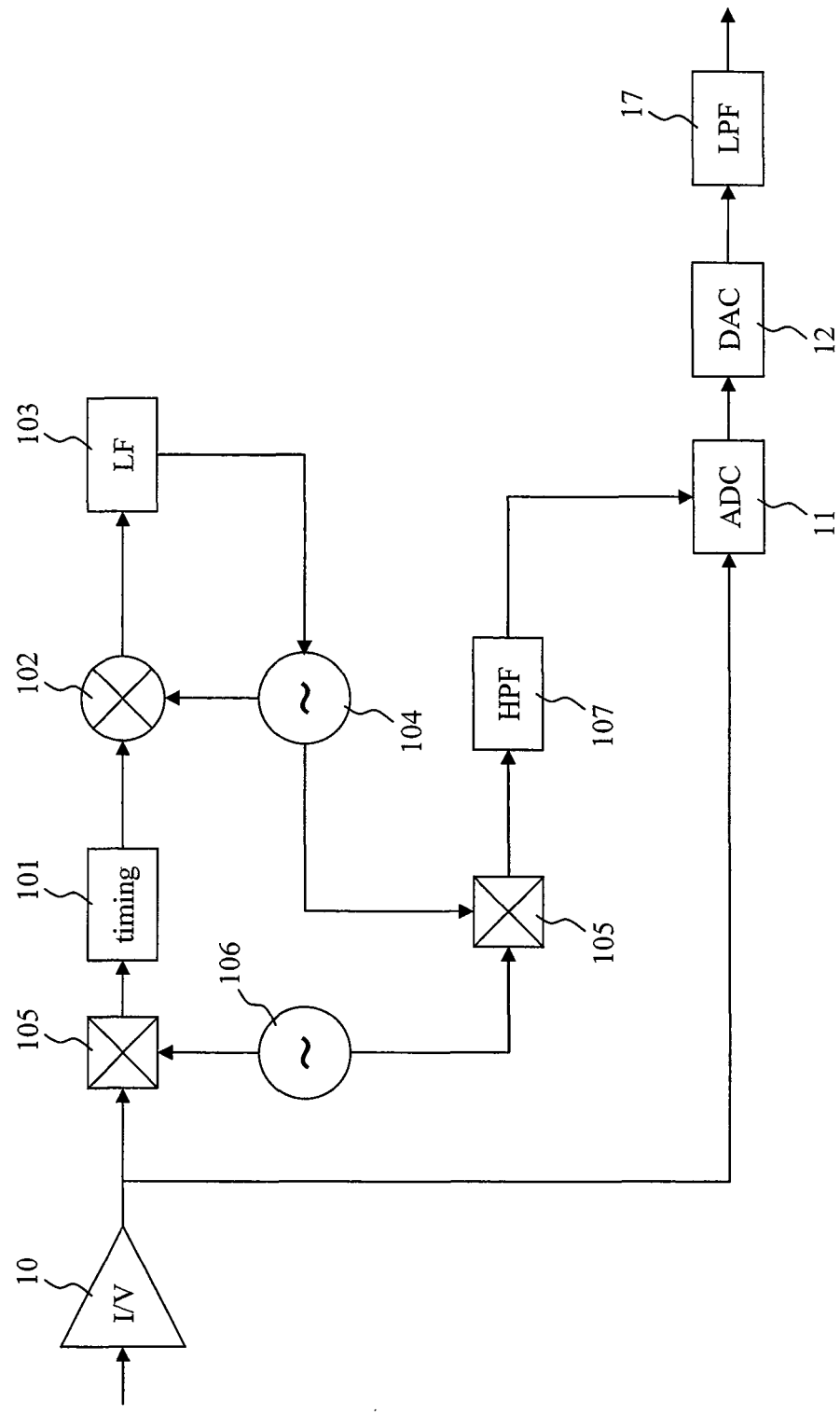
FIG. 13 is a diagram describing another method of autonomously synchronizing the driving clock of the ADC and the DAC to the pulsed read signal clock.

This point is improved in the exemplar configuration illustrated in FIG. 13 by temporarily converting the carrier frequency to an intermediate frequency. Specifically, the output of the current amplifier 10 is inputted into a mixer 105. The output of a local oscillator 106 is inputted into the other input of the mixer 105. Note that the oscillating frequency of the local oscillator 106 which is denoted by $f_{LO}$ is lower than the carrier frequency thus $f_{HF}/2 < f_{LO} < f_{HF}$. The mixer 105 multiplies the two input signals. Accordingly, the frequency of the carrier is converted to two different frequencies of $f_{HF}-f_{LO}$ and $f_{HF}+f_{LO}$. The function of the timing detection filter 101 in FIG. 13 is basically the same as that of the timing detection filter 101 used in the previous example, however, it differs by the center frequency of the passband being $f_{HF}-f_{LO}$. The description for the phase synchronization process of the voltage controlled oscillator output is omitted because it is similar as that of the previous example.

In the present example, the frequency of the output of the voltage controlled oscillator 104 is not the carrier frequency but it is equal to $f_{HF}-f_{LO}$. Accordingly the output of the voltage controlled oscillator 104 cannot be used as the driving clock of the ADC 11 and of the DAC 12. Therefore, second frequency conversion is performed by multiplying the output of the voltage controlled oscillator 104 and the output of the local oscillator 106 by using a second mixer 105. The second mixer 105 outputs signals with two different kinds of frequencies: one is $f_{HF}$; and the other is $f_{HF}-2f_{LO}$. Of the two different signals, the one with the frequency of $f_{HF}$ is chosen by using a high-pass filter 107, and it is used as the driving clock of the ADC 11 and the DAC 12. One the advantage of this method is that the modulation frequency can be altered. Specifically, if the modulation frequency is altered, the oscillating frequency of the local oscillator 106 has only to be altered in response to the alteration of the modulating frequency. That is, the oscillating frequency has to be altered so that $f_{HF}-f_{LO}$ can be equal to the center frequency of the passband of the timing detection filter 101.

Figure 14:
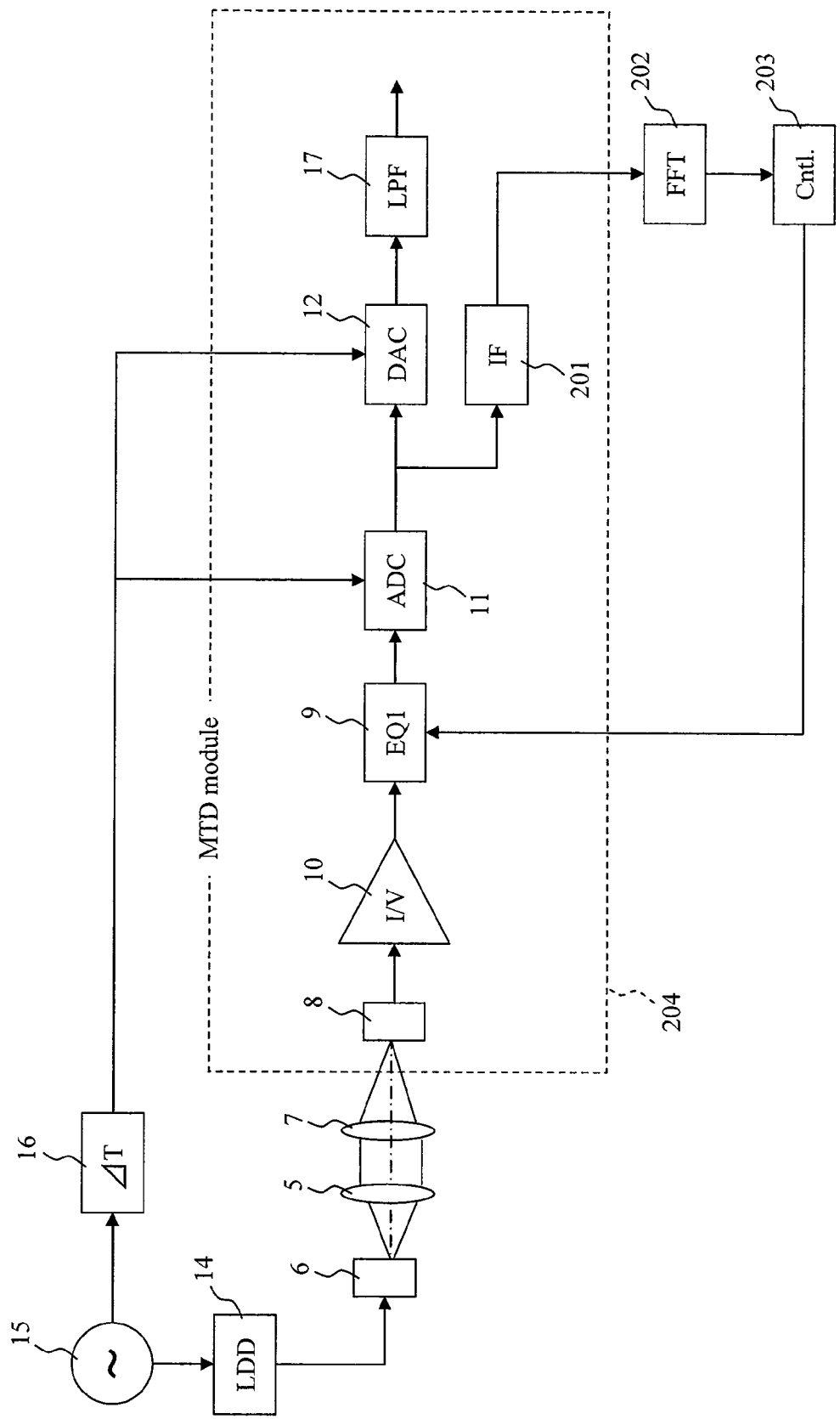
FIG. 14 is a diagram describing how the first equalizer is adjusted at the time of shipment.

Individual component parts—e.g., photodiodes, current amplifiers, low-pass filters, or equalizers—have variation in frequency characteristics. Accordingly, it results in variation of SNR gains due to the input bandwidth variances even if components of the same specifications are used under the same design. As shown in FIG. 14, such differences in the SNR gain may be reduce to utmost level by adjusting a module at the time of shipment, which is the mechanism portion starting from the photoelectric conversion to the acquisition of the continuous read signal (the portion inside the dashed-line rectangular in FIG. 14) is formed as an independent MTD module 204.

FIG. 14 illustrates an exemplar setup when the adjustment at the shipment is performed. The adjustment at the shipment is performed while irradiating the photodiode 8 with a pulsed light. Specifically, the oscillator 15 generates the original signal used for modulating the laser, and the signal is inputted into the laser driver 14. The laser driver 14 generates a laser driving signal by, for example, applying an appropriate bias voltage to the output of the oscillator 15. The driving signal is used to drive a laser diode 6. A laser beam is emitted from the laser diode 6. The emitted laser beam is converted, by a collimator 5, to parallel light beam, which is then focused by the focusing lens 7 on the photodiode 8. The photodiode 8 then converts the laser beam to current.

The current amplifier 10 converts this current signal to a voltage signal, which is then inputted into the first equalizer 9. The photodiode 8 and the current amplifier 10 used here have bandwidths that are wider than the modulation frequency of the laser. Accordingly, the voltage signal received by the first equalizer 9 is also a pulsed signal train. The first equalizer 9 gradually limits the bandwidth of the pulsed read signal. The first equalizer used here is capable of adjusting its cut-off frequency. The output of the oscillator 15 is inputted into the ADC 11 as its driving clock. The ADC 11 samples the peaks of the pulses in the pulsed read signal. Phase differences exist between the driving clock of the ADC 11 and the pulses of the pulsed read signal due to the delay caused at the photodiode 8 and in the process till the emission of the laser light. The variable delay line 16 is used for adjusting such phase difference. The digital output of the ADC 11 is inputted directly into the DAC 12. The DAC 12 uses the same driving clock as that the ADC 11 uses.

An interface circuit 201 is capable of outputting the digital output of the ADC 11 to the outside of the MTD module 204. A Fourier analyzer 202 analyzes the frequency characteristics all the way from the photodiode 8 via the current amplifier 10 to the first equalizer 9 by applying the discrete Fourier conversion to this digital output of the ADC 11. In the example illustrated in FIG. 14, both the laser diode 8 and the laser driver 14 form parts of the assessment system, and their characteristics have been measured beforehand. In addition, the both the laser diode 8 and the laser driver 14 are maintained to keep their characteristic constant. An adjustor 203 adjusts the frequency characteristics of the first equalizer 9 so that the harmonic amplitudes will match with their respective design values.

Suppose a case where the MTD module 204 is actually used in an optical disc drive. If the clock jitter is sufficiently small, there arises no particular problem. In practice, the clock jitter sometimes becomes larger because of the influence exerted by external noise. In such a case, it is possible to reduce the influence by re-adjusting the cut-off frequency of the first equalizer 9.

In general, the increase in clock jitter is caused by the problem related to the designs and the actual mounting of the drive and the pickup. Accordingly, to reduce the increase in clock jitter, the bandwidth of the first equalizer 9 has only to be adjusted at the shipment of the drive.

Figure 15:
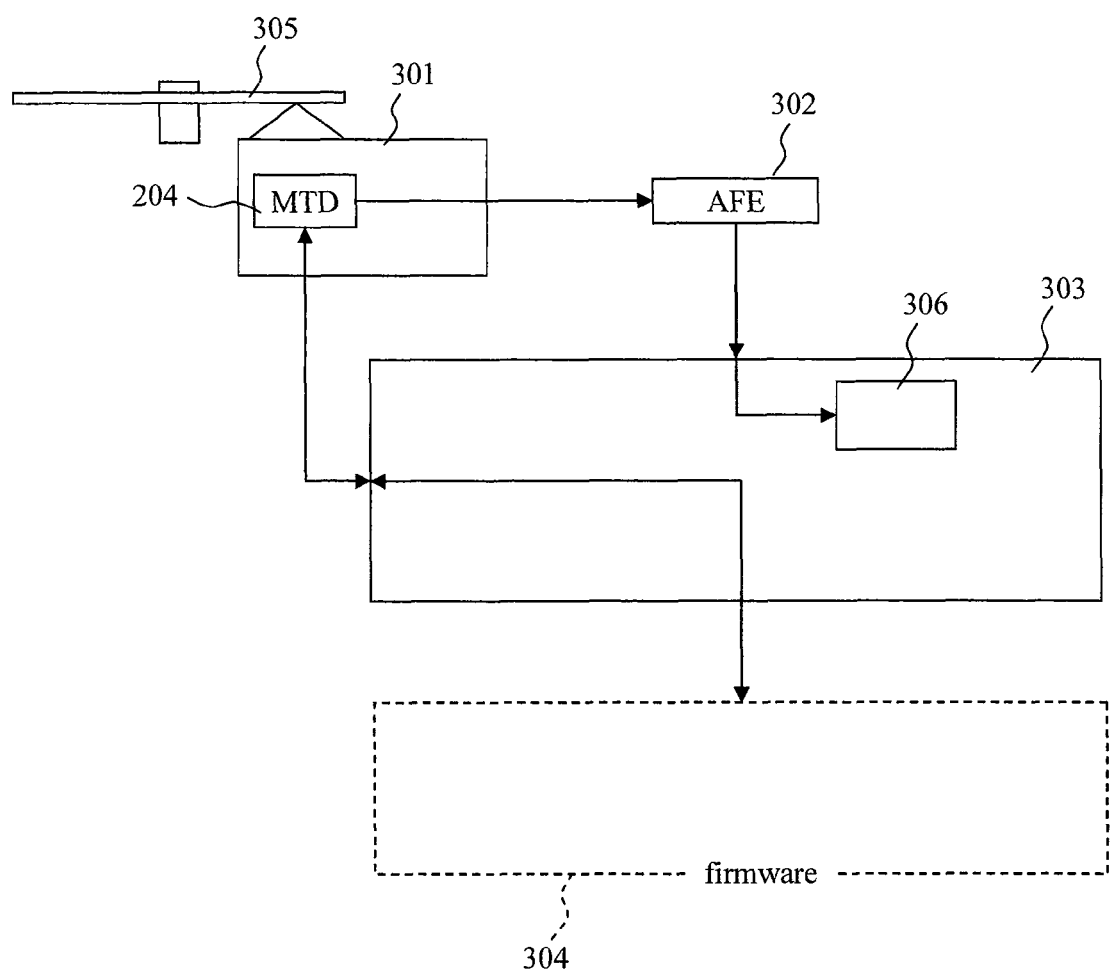
FIG. 15 is a diagram describing the configuration of an optical disc drive equipped with an MTD module and describing how the optical disc drive is adjusted at the time of shipment.

FIG. 15 illustrates an exemplar configuration of an optical disc drive equipped with the MTD module 204. The MTD module 204 is built in a pickup 301. The output signal of the MTD module 204—i.e., the read signal—is inputted into an analog front-end IC 302. An analog equalizer for the read signal and the like are integrated in the analog front-end IC 302. The analog-equalized output signal is inputted into a system LSI 303. Integrated in the system LSI 303 are, for example, memories and processors for various functions and controls, such as a channel to decode the read signal. A firmware 304 controls the operation of the optical disc drive. Though, the firmware 304 is depicted outside the system LSI 303 for the sake of convenience in FIG. 15, the firmware 304 is stored in the memory of the system LSI 303 in practice.

The adjustment at the shipment is carried out while the optical disc drive is reading a standard disc 305. A signal that has been adjusted to have sufficiently small shift is recorded on the standard disc 305. While the firmware 304 is sending commands to make the MTD module 204 alter the cut-off frequency consecutively, the firmware 304 analyze the jitter of the read signal using the jitter analyzer circuit 306 which is integrated in the system LSI 303. Then, the frequency characteristics of the first equalizer 9 that minimize the jitter are identified, and the frequency characteristics thus identified are set for the optical disc drive.

The invention is applicable commonly to various types of optical disc drives.

EXPLANATION OF REFERENCE NUMERALS 1 optical disc
2 objective lens
3 quarter wave length plate
4 polarizing beam splitter
5 collimator
6 laser diode
7 focusing lens
8 photodiode
9 first equalizer
10 current amplifier
11 ADC
12 DAC
13 second equalizer
14 laser driver
15 oscillator
16 variable delay line
17 low-pass filter
18 peak-hold circuit
101 timing detection filter
102 phase comparator
103 loop filter
104 voltage controlled oscillator
105 mixer
106 local oscillator
107 high-pass filter
201 interface circuit
202 Fourier analyzer
203 adjustor
204 MTD module
301 pickup
302 analog front-end IC
303 system LSI
304 firmware
305 standard disc
306 jitter analyzer circuit

What is claimed is:

1. An optical disc apparatus comprising:
a laser light source;
a light-source driving section that pulse-drives the laser light source;
an optical system that emits the laser light generated by the laser light source onto an optical disc;
a photodetector that receives the laser light reflected from the optical disc;
a means for converting output of the photodetector to an electric, pulsed read signal;
a means for controlling harmonic amplitudes of the pulsed read signal; and
a means for converting the harmonic amplitude controlled pulsed read signal to a temporally continuous read signal, the conversion means operating synchronously with pulses of the harmonic amplitude controlled pulsed read signal.

2. The optical disc apparatus according to claim 1 further comprising a means for controlling high-frequency components of an output signal of the light-source driving section so as to boost the high-frequency components.

3. The optical disc apparatus according to claim 1 further comprising a means for synchronizing autonomously the means for converting the pulsed read signal to a temporally continuous read signal with the pulsed read signal.

4. The optical disc apparatus according to claim 3 further comprising:
a means for executing frequency conversion of a clock frequency of the pulsed read signal;
a signal source that is synchronized with the resultant clock of the pulsed read signal that has been subjected to the frequency conversion; and
a means for converting output of the signal source back to the frequency of the pulsed read signal.

5. A signal conversion module comprising:
a photodetector;
a means for converting output of the photodetector that has received a pulsed-laser-light signal to an electric, pulsed read signal;
a means for controlling harmonic amplitudes of the pulsed read signal;
a means for converting the harmonic amplitude controlled pulsed read signal to a time discrete signal, the conversion means operating synchronously with pulses of the harmonic amplitude controlled pulsed read signal;
a means for converting the read signal that has been converted to the time discrete signal to a continuous signal; and
a means for outputting the time discrete signal.

6. An adjustment system to adjust the signal conversion module according to claim 5 comprising:
a laser light source;
a light-source driving section that pulse-drives the laser light source;

an optical system that emits laser light generated by the laser light source onto the photodetector of the signal conversion module;

a means for analyzing a spectrum of the time discrete signal outputted from the signal conversion module; and a means for adjusting the means for controlling harmonic amplitudes of the signal conversion module so as to approximate the analysis result of the means for analyzing a spectrum to a desired result.

7. An optical disc apparatus comprising the signal conversion module according to claim 5 mounted therein.

* * * * *